J. Shorey,
Curtain Fixture,
No. 81,019. Patented Aug. 11, 1868.
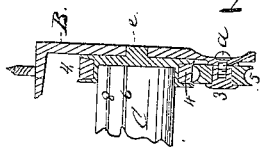
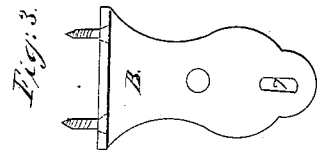
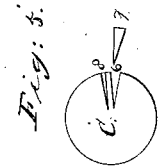
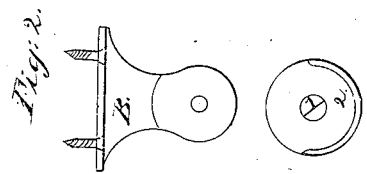
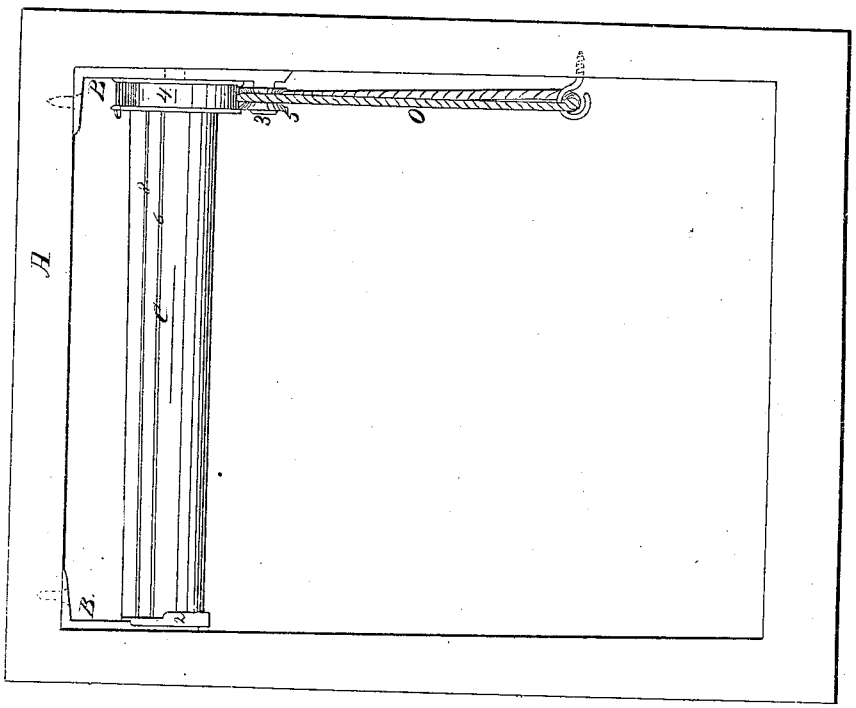
Witnesses:
G. Wilson
Julian Abbot
Inventor:
John Shorey

UNITED STATES PATENT OFFICE.

JOHN SHOREY, OF LOWELL, MASSACHUSETTS.

IMPROVED CURTAIN-FIXTURE.

Specification forming part of Letters Patent No. 81,019, dated August 11, 1868.

*To all whom it may concern:*

Be it known that I, JOHN SHOREY, of the city of Lowell, county of Middlesex, State of Massachusetts, have invented a new and Improved Window-Curtain Fixture and Method of Hanging Curtains; and I do hereby declare the following to be a full, clear, and exact description of the same, reference being had to the accompanying drawings, and to the letters of reference marked thereon.

Figure 1 shows a front view when put up. Fig. 2 shows a front view of the left-side bracket. Fig. 3 shows a front view of the right-side bracket. Fig. 4 shows a cross-section of the fixture on the right-hand side. Fig. 5 shows end view of the roller $c$.

Fig. 2 shows the left-side bracket, or the bracket opposite to the one to which the cord is applied, with the adjustable bearing 2, which is fastened to the bracket B by the set-screw 1 in the hole in B, as shown in Fig. 2 of drawings.

The bearing 2 is fastened to the left-hand bracket, or the bracket opposite to the one to which the cord is applied, and shown in Fig. 2 immediately above the bearing 2.

In cases of putting the brackets B B on the outside of the window-frame, so that they shall project in a horizontal instead of a hanging position, as shown, the bearing 2 may be so adjusted as to let the roller $c$ drop into it, and still hold it firm by means of a flange, which projects on one-half of the bearing 2, as shown in Figs. 1 and 2. The flange keeps the end of the roller from moving sidewise or dropping down, but still allows it to turn freely.

Fig. 4 shows the bracket B, with the grooved pulley $e$. The groove in the pulley $e$ is filled with soft rubber or other elastic packing. It also shows the friction-pulley 5, turning on the stud 3, which is kept in place by the set-screw $a$, passing through the slot 7 in the bracket B, so that the friction may be relaxed or increased at pleasure.

Fig. 5 shows the end of the roller $c$, with the slots 6 and 8 cut with a saw nearly to the center of the roller $c$, leaving a small piece between the slots.

One end of the curtain is put into the slot 8, and the wedge 9 is then forced into the slot 6, thus holding the curtain firmly in its place.

The advantages are: There are no springs to get out of order, the cord $o$ cannot get out of place, and the friction-pulley 5, pressing the endless cord $o$ on the rubber packing 4, creates friction, which holds the curtain in any position desired.

Claims.

What I claim as my invention, and wish to secure by Letters Patent, is—

1. The adjustable bearing 2, with the projecting flange for holding the end of the roller, as shown in Figs. 1 and 2, in connection with the bracket B, as shown in Fig. 2, as shown and described, and for the purposes set forth.

2. The pulley $e$, with the rubber packing 4, in connection with the friction-pulley 5, when made and operated substantially as and for the purposes set forth and described.

3. The combination of the roller, slotted at 6 and 8, and wedge 9, for the purpose of fastening the curtain to the roller, as and for the purposes set forth and described.

JOHN SHOREY.

Witnesses:
G. WILSON,
JULIAN ABBOT.